US012684666B2

(12) United States Patent
Lai et al.

(10) Patent No.: US 12,684,666 B2
(45) Date of Patent: Jul. 14, 2026

(54) LED DRIVING CIRCUIT

(71) Applicant: Silergy Semiconductor Technology (Hangzhou) LTD, Hangzhou (CN)

(72) Inventors: Hongbin Lai, Hangzhou (CN); Shujian Lin, Hangzhou (CN)

(73) Assignee: Silergy Semiconductor Technology (Hangzhou) LTD., Hangzhou (CN)

( * ) Notice: Subject to any disclaimer, the term of this patent is extended or adjusted under 35 U.S.C. 154(b) by 95 days.

(21) Appl. No.: 18/732,875

(22) Filed: Jun. 4, 2024

(65) Prior Publication Data

US 2024/0414823 A1 Dec. 12, 2024

(30) Foreign Application Priority Data

Jun. 9, 2023 (CN) ......................... 202310686168.1

(51) Int. Cl.
*H05B 45/345* (2020.01)

(52) U.S. Cl.
CPC .................................. *H05B 45/345* (2020.01)

(58) Field of Classification Search
CPC ...... H05B 45/24; H05B 45/40; H05B 45/345; H05B 45/395; H05B 45/3725
See application file for complete search history.

(56) References Cited

U.S. PATENT DOCUMENTS

| | | | | |
|---|---|---|---|---|
| 6,005,780 | A | 12/1999 | Hua | |
| 6,580,258 | B2 | 6/2003 | Wilcox et al. | |
| 9,325,254 | B2 | 4/2016 | Deng et al. | |
| 9,331,588 | B2 | 5/2016 | Chen | |
| 9,488,680 | B2 | 11/2016 | Xu | |
| 2011/0115399 | A1 * | 5/2011 | Sadwick | H05B 45/385 315/287 |
| 2014/0078789 | A1 | 3/2014 | Li et al. | |
| 2014/0239934 | A1 | 8/2014 | Zhang | |
| 2015/0115809 | A1 * | 4/2015 | Siessegger | H05B 47/11 315/291 |
| 2015/0160270 | A1 | 6/2015 | Shi et al. | |
| 2015/0280578 | A1 | 10/2015 | Huang et al. | |
| 2016/0020699 | A1 | 1/2016 | Shen et al. | |
| 2016/0165688 | A1 * | 6/2016 | Makino | H02M 1/4208 315/200 R |
| 2020/0091826 | A1 | 3/2020 | Yang et al. | |
| 2022/0353971 | A1 * | 11/2022 | Luo | H05B 45/54 |
| 2023/0223833 | A1 * | 7/2023 | Newman, Jr. | H02M 1/081 363/126 |

FOREIGN PATENT DOCUMENTS

| | | | | |
|---|---|---|---|---|
| CN | 102263492 | A * | 11/2011 | H02M 1/4208 |
| CN | 102695339 | A * | 9/2012 | H05B 45/14 |
| CN | 108809107 | B | 11/2018 | |
| KR | 20130113363 | A * | 10/2013 | |
| KR | 20140022344 | A * | 2/2014 | H03K 17/04106 |

* cited by examiner

*Primary Examiner* — Abdullah A Riyami
*Assistant Examiner* — Syed M Kaiser

(57) ABSTRACT

An LED driving circuit can include: a linear driving circuit coupled in series with an LED load, in order to control a current flowing through the LED load; a first capacitor coupled in parallel with a serial structure having the linear driving circuit and the LED load; and a control circuit configured to decrease a difference between a voltage of the first capacitor and a load voltage of the LED load, in order to increase an efficiency of the LED driving circuit.

19 Claims, 11 Drawing Sheets

LED DRIVING CIRCUIT

RELATED APPLICATIONS

This application claims the benefit of Chinese Patent Application No. 202310686168.1, filed on Jun. 9, 2023, which is incorporated herein by reference in its entirety.

FIELD OF THE INVENTION

The present invention generally relates to the field of power electronics, and more particularly to LED driving circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
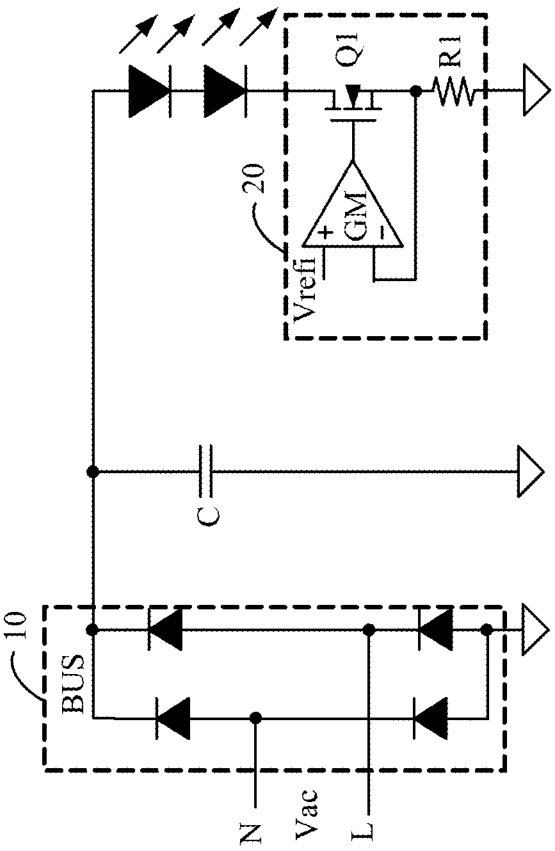
FIG. 1 is a schematic block diagram of an example LED driving circuit.

Referring now to FIG. 1, shown is a schematic block diagram of an example light-emitting diode (LED) driving circuit. LEDs are known for their relatively high efficiency, long lifespan, and low power consumption, and are therefore widely used as light sources. As constant current loads, LEDs require a driver module capable of delivering a steady current. The example LED driving circuit can include rectifier circuit 10, electrolytic capacitor C, and linear driving circuit 20. Rectifier circuit 10 may receive an alternating-current (AC) input voltage Vac, and convert it into a direct-current (DC) input voltage for output. Electrolytic capacitor C can connect to the output terminals of rectifier circuit 10, while the LED load and linear driving circuit 20 can connect in series to the output terminals of rectifier circuit 10. However, relatively large voltage difference across linear driving circuit 20 may result in higher power consumption and lower efficiency for the LED driving circuit.

In particular embodiments, an LED driving circuit can drive an LED load, and may include a linear driving circuit, a first capacitor, and a control circuit. The linear driving circuit can connect in series with the LED load to control a current flowing through the LED load. The first capacitor can connect in parallel with a series connection of the linear driving circuit and the LED load. The control circuit can control a voltage of the first capacitor to decrease a voltage difference between two terminals of the linear driving circuit, in order to increase an efficiency of the LED driving circuit. The voltage of the first capacitor described herein may refer to a voltage difference between the upper and lower plates of the first capacitor. Additionally, the load voltage of the LED load may refer to a voltage difference between two terminals of the LED load.

Alternatively, the control circuit can control the voltage of the first capacitor based on a voltage sampling signal indicating the difference between the voltage of the first capacitor and the load voltage of the LED load, or the voltage difference between the two terminals of the linear driving circuit. In one embodiment, the difference may be generated based on the voltage of the first capacitor and the load voltage of the LED load, and sampled to generate the voltage sampling signal. Since the difference between the voltage of the first capacitor and the load voltage of the LED load may also be indicated by the voltage difference between the two terminals of the linear driving circuit, the control circuit can control the voltage of the first capacitor based on a voltage sampling signal indicating the voltage difference between the two terminals of the linear driving circuit. In another example, the control circuit can control a current flowing through the first capacitor, in order to control the voltage of the first capacitor.

In particular embodiments, the LED driving circuit can include the control circuit controlling the voltage of the first capacitor based on the voltage sampling signal indicating the voltage difference between the two terminals of the linear driving circuit. Further, the voltage sampling signal indicating the voltage difference between the two terminals of the linear driving circuit can be obtained by a single-terminal sampling or a differential sampling. For example, the single-terminal sampling may be performed on a voltage at a common terminal of the linear driving circuit and the LED load to generate the voltage sampling signal, or the differential sampling can be performed on voltages at the two terminals of the linear driving circuit to generate the voltage sampling signal.

The control circuit can compare the voltage sampling signal against a threshold voltage, in order to control the voltage of the first capacitor. When the voltage sampling signal is less than the threshold voltage, the control circuit can increase the voltage of the first capacitor, thus increasing a magnitude of the voltage sampling signal. When the voltage sampling signal is greater than the threshold voltage, the control circuit can decrease the voltage of the first capacitor, thus decreasing the magnitude of the voltage sampling signal. When the voltage sampling signal is less than the threshold voltage, the control circuit can increase the voltage of the first capacitor. Any control circuit suitable for achieving the above operations can be utilized in certain embodiments.

The LED driving circuit of particular embodiments can adaptively control the voltage of the first capacitor, thus ensuring that the voltage of the first capacitor closely matches the load voltage of the LED load and the voltage difference across the linear driving circuit is relatively small or the smallest, and thus allowing the LED driving circuit to operate with a relatively high or the highest efficiency.

Figure 2:
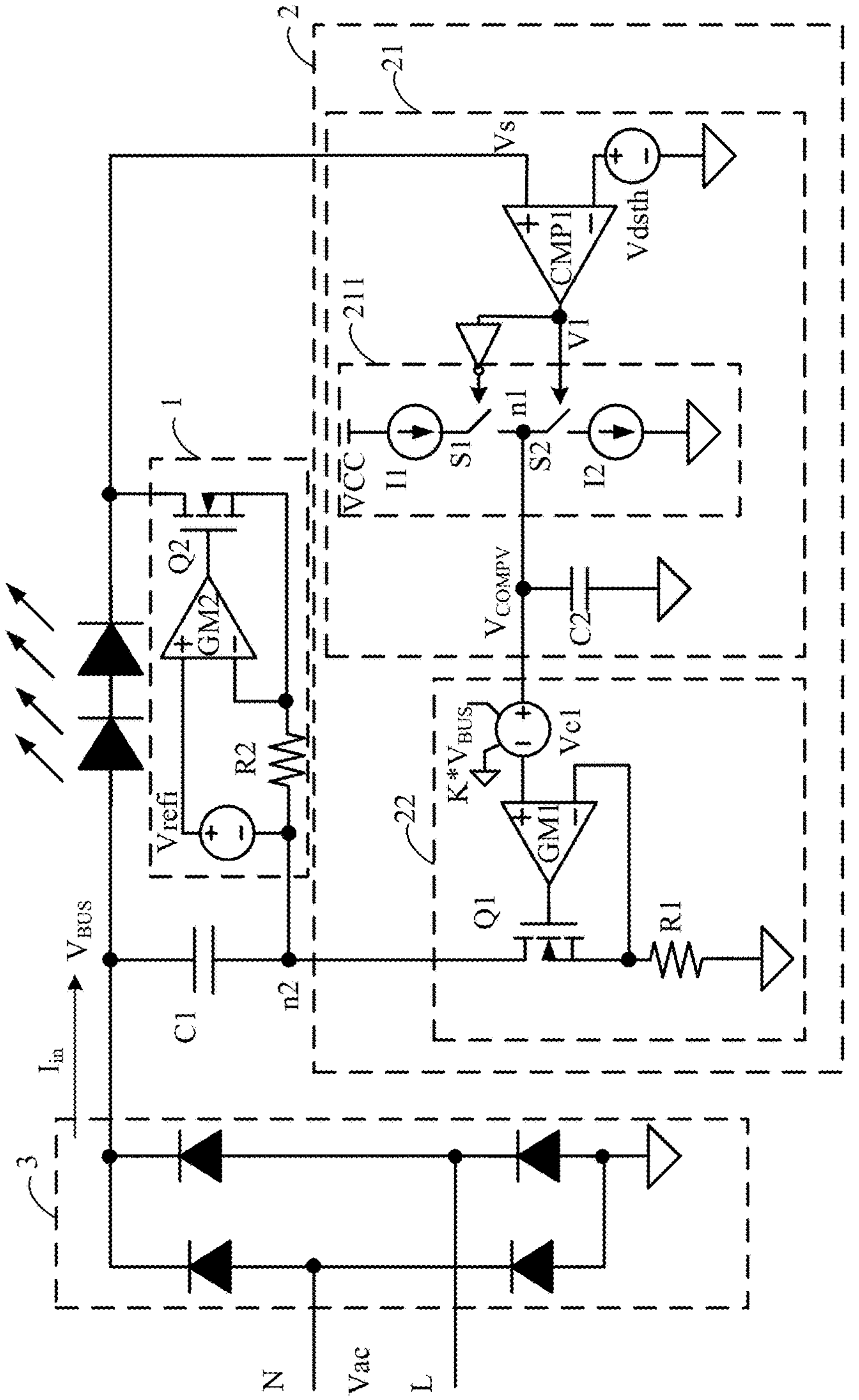
FIG. 2 is a schematic block diagram of a first example LED driving circuit, in accordance with embodiments of the present invention.

Referring now to FIG. 2, shown is a schematic block diagram of a first example LED driving circuit, in accordance with embodiments of the present invention. In this particular example, the LED driving circuit can include linear driving circuit 1, capacitor C1, control circuit 2, and rectifier circuit 3. Linear driving circuit 1 can connect in series with an LED load to control a current flowing through the LED load. Capacitor C1 can connect in parallel with a series connection of linear driving circuit 1 and the LED load. Control circuit 2 can control a voltage of capacitor C1 to decrease a voltage difference between two terminals of linear driving circuit 1, to increase the efficiency of the LED driving circuit. Rectifier circuit 3 can receive AC input voltage Vac, and then convert AC input voltage Vac into bus voltage VBUS.

Control circuit 2 can control the voltage of capacitor C1 based on a voltage sampling signal indicating the difference between the voltage of capacitor C1 and the load voltage of the LED load. As an example, control circuit 2 can control the voltage of capacitor C1 based on a voltage sampling signal indicating a voltage difference between two terminals of linear driving circuit 1. For example, the voltage difference between the two terminals of linear driving circuit 1 may also be indicated by a voltage at a common terminal of linear driving circuit 1 and the LED load. Therefore, control circuit 2 can also include a sampling circuit in some cases.

The sampling circuit may perform a single-terminal sampling on the voltage at the common terminal of linear driving circuit 1 and the LED load, in order to generate voltage sampling signal Vs. As an example, linear driving circuit 1 can include power switch Q2, a second sampling unit, and error amplifier GM2. The second sampling unit can include resistor R2, which can connect in series with power switch Q2 and the LED load. A first input of error amplifier GM2 may receive dimming control signal Vrefi, and dimming control signal Vrefi can be generated based on dimming requirements, which may be a fixed value or a variable value. A second input of error amplifier GM2 can connect to a common terminal of power switch Q2 and resistor R2. An output of error amplifier GM2 can connect to a control terminal of power switch Q2. The sampling circuit may perform the single-terminal sampling on a voltage at a common terminal of power switch Q2 and the LED load.

The LED load, power switch Q2, and resistor R2 can connect in series between a high-potential terminal and a ground-potential terminal of the capacitor C1. For example, power switch Q2, resistor R2, and the LED load can connect in series sequentially between the high-potential terminal and the ground-potential terminal of capacitor C1. Control circuit 2 can include control signal generation circuit 21 and voltage control circuit 22. Control signal generation circuit 21 May receive voltage sampling signal Vs and a threshold voltage Vdsth to obtain control signal $V_{COMPV}$. Voltage control circuit 22 may receive control signal $V_{COMPV}$, and can control the voltage of capacitor C1 based on control signal $V_{COMPV}$.

As an example, a variation trend of control signal $V_{COMPV}$ can be opposite to a variation trend of voltage sampling signal Vs, and may be consistent with a variation trend of the voltage of capacitor C1. That is, voltage sampling signal Vs indicating the voltage difference between the two terminals of linear driving circuit 1 can be opposite to the voltage of capacitor C1. It should be noted that any control circuit capable of ensuring that the variation trend of voltage sampling signal Vs is opposite to the variation trend of the voltage of capacitor C1 may be utilized in certain embodiments.

Control signal generation circuit 21 can include comparator CMP1, capacitor C2, and charging-discharging circuit 211. A first input of comparator CMP1 may receive voltage sampling signal Vs, a second input of comparator CMP1 may receive threshold voltage Vdsth, and an output of comparator CMP1 can generate comparison signal V1. A voltage of capacitor C2 (or, a voltage difference between upper and lower plates of capacitor C2) may be configured as control signal $V_{COMPV}$. When voltage sampling signal Vs is less than threshold voltage Vdsth, charge-discharge circuit 211 can charge capacitor C2, thus increasing a magnitude of control signal $V_{COMPV}$. When voltage sampling signal Vs is greater than threshold voltage Vdsth, charge-discharge circuit 211 can discharge capacitor C2, thus decreasing the magnitude of control signal $V_{COMPV}$.

As an example, charging-discharging circuit 211 can include constant current source I1, switch S1, constant current source I2, and switch S2. Constant current source I1 and switch S1 can connect in series between a power supply VCC and node n1. Constant current source I2 and switch S2 can connect in series between node n1 and the ground potential. Capacitor C2 can connect between node n1 and the ground potential. A control terminal of switch S2 may receive comparison signal V1, and a control terminal of switch S1 may receive comparison signal V1 through an inverter. That is, an operational state of switch S2 can be controlled by comparison signal V1, and an operational state of switch S1 can be controlled by an inverted signal of comparison signal V1. When voltage sampling signal Vs is less than threshold voltage Vdsth, comparison signal V1 can be at a low level, switch S2 open, and switch S1 closed, such that constant current source I1 can charge capacitor C2, thus increasing the magnitude of control signal $V_{COMPV}$. When voltage sampling signal Vs is greater than threshold voltage Vdsth, comparison signal V1 can be at a high level, switch S2 closed, and switch S1 open, such that constant current source I2 may discharge capacitor C2, thus decreasing the magnitude of control signal $V_{COMPV}$.

In one example, charging-discharging circuit 211 can include first and second voltage-controlled current sources, which can connect in series between the power supply VCC and the ground potential. Capacitor C2 can connect between the ground potential and a common terminal of the first voltage-controlled current source and the second voltage-controlled current source. A control terminal of the first voltage-controlled current source may receive comparison signal V1, and a control terminal of the second voltage-controlled current source may receive comparison signal V1 through an inverter. As an example, voltage control circuit 22 and capacitor C1 can connect in series to output terminals of rectifier circuit 3, and voltage control circuit 22 can control a current flowing through capacitor C1 based on control signal VCOMPV to control the voltage of capacitor C1.

For example, voltage control circuit 22 can include power switch Q1, a first sampling unit, and error amplifier GM1. The first sampling unit can include resistor R1. Power switch Q1 and resistor R1 can connect in series between a second node n2 and the ground potential. A first input of error amplifier GM1 can connect to a first power terminal of a first voltage-controlled voltage source Vc1, a second input of error amplifier GM1 can connect to a common terminal of power switch Q1 and resistor R1, and an output of error amplifier GM1 can connect to a control terminal of power switch Q1. A second power terminal of voltage-controlled voltage source Vc1 may receive control signal $V_{COMPV}$, and a control terminal of voltage-controlled voltage source Vc1 may receive a first reference signal. As an example, the first reference signal can be proportional to bus voltage VBUS, e.g., K*VBUS, where K is a scaling factor. Therefore, a voltage at the first power terminal of voltage-controlled voltage source Vc1 is $V_{COMPV}$-K*VBUS. As can be seen, a variation trend of the voltage at the first power terminal of voltage-controlled voltage source Vc1 can be consistent with (e.g., the same as) the variation trend of control signal $V_{COMPV}$.

As an example, capacitor C1 can connect between a high-potential terminal of the output of rectifier circuit 3 and node n2. For example, power switch Q1 may operate in a linear state. When the magnitude of control signal $V_{COMPV}$ increases, the voltage at the first power terminal of voltage-controlled voltage source Vc1 can increase, and a current flowing through power switch Q1 may increase, such that a charging current of capacitor C1 increases, and the voltage of capacitor C1 increases. When the magnitude of control signal $V_{COMPV}$ decreases, the voltage at the first power terminal of voltage-controlled voltage source Vc1 can decrease, and the current flowing through power switch Q1 may decrease, such that the charging current of capacitor C1 decreases, and the voltage of capacitor C1 decreases.

When voltage sampling signal Vs is less than threshold voltage Vdsth, the control circuit can increase the voltage of capacitor C1. Since a value of the load voltage of the LED load is relatively fixed, the magnitude of voltage sampling signal Vs can increase. When voltage sampling signal Vs is greater than threshold voltage Vdsth, the control circuit can decrease the voltage of capacitor C1. When voltage sampling signal Vs is less than threshold voltage Vdsth, the control circuit can increase the voltage of capacitor C1. Since the value of the load voltage of the LED load is relatively fixed, the magnitude of voltage sampling signal Vs may decrease. Continuously performing the above dynamic adjustment can make voltage sampling signal Vs substantially equal to threshold voltage Vdsth in a steady state (e.g., voltage sampling signal Vs fluctuates within a certain range above and below threshold voltage Vdsth). When threshold voltage Vdsth has a smaller value, since the voltage difference between the two terminals of linear driving circuit 1, which is proportional to voltage sampling signal Vs, can be equal to the difference between the voltage of capacitor C1 and the load voltage of the LED load. Also, voltage sampling signal Vs can be substantially equal to threshold voltage Vdsth, so the difference between the voltage of capacitor C1 and the load voltage of the LED load becomes smaller, but can result in higher efficiency of the LED driving circuit.

Those skilled in the art will recognize that the efficiency of the LED driving circuit is influenced by threshold voltage Vdsth. When configuring the LED load for normal operation and minimizing the current flowing through the LED load, the voltage at the common terminal of the LED load and power switch Q2, or a voltage difference between two terminals of power switch Q2, can match threshold voltage Vdsth. At which time, the voltage difference between the two terminals of linear driving circuit 1 can be minimized, resulting in the lowest power consumption and highest efficiency for the LED driving circuit.

Figure 3:
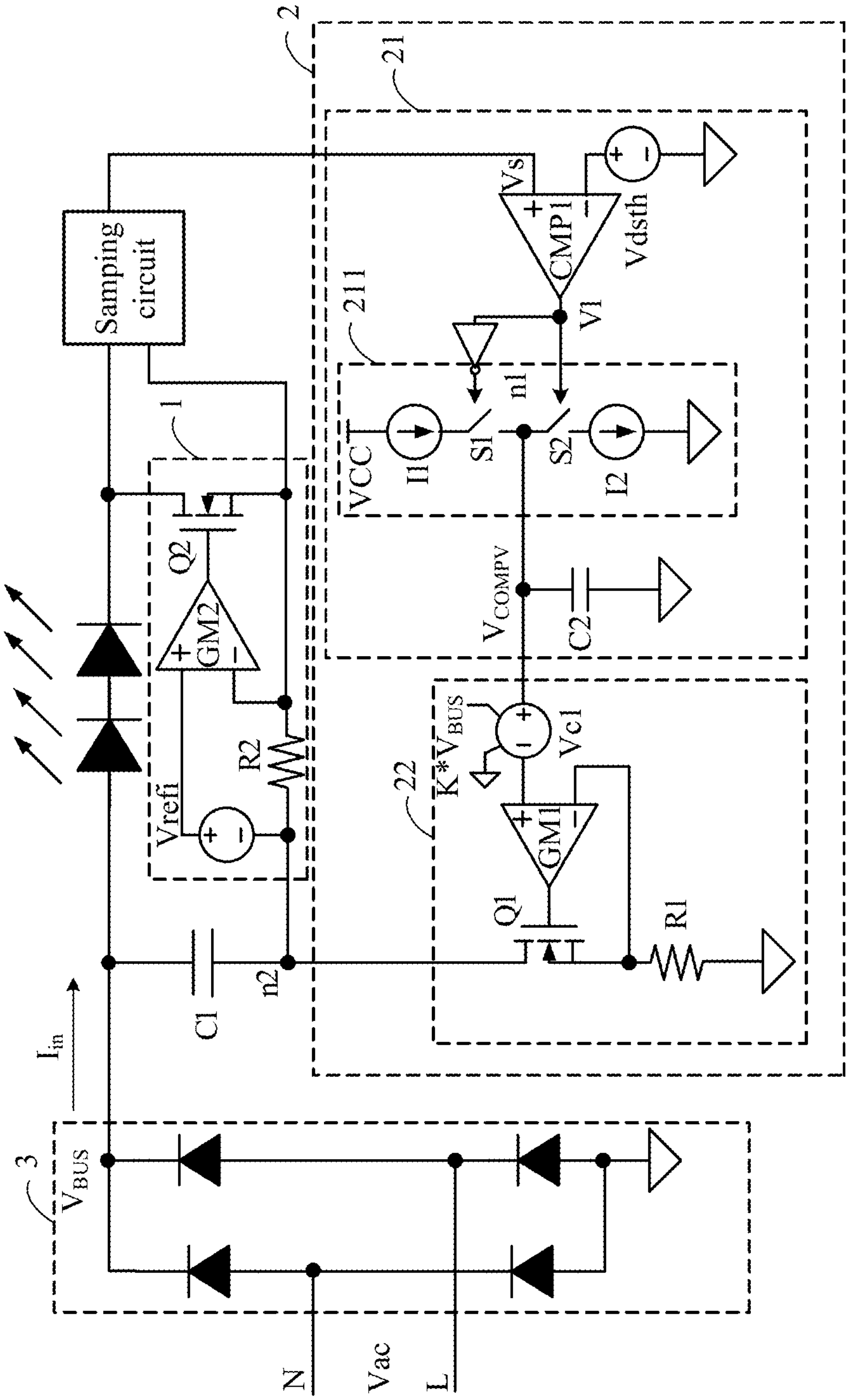
FIG. 3 is a schematic block diagram of a second example LED driving circuit, in accordance with embodiments of the present invention.

Referring now to FIG. 3, shown is a schematic block diagram of a second example LED driving circuit, in accordance with embodiments of the present invention. In this particular example, the sampling circuit can perform the differential sampling on the voltages at the two terminals of the linear driving circuit, in order to generate voltage sampling signal Vs. For example, the sampling circuit may perform the differential sampling on the voltage difference between the two terminals of power switch Q2, in order to generate voltage sampling signal Vs. As another example, the sampling circuit may perform the differential sampling on a voltage difference between a second terminal of resistor R2, and the common terminal of the LED load and power switch Q2. A first terminal of resistor R2 can connect to the second input of error amplifier GM2.

Figure 4:
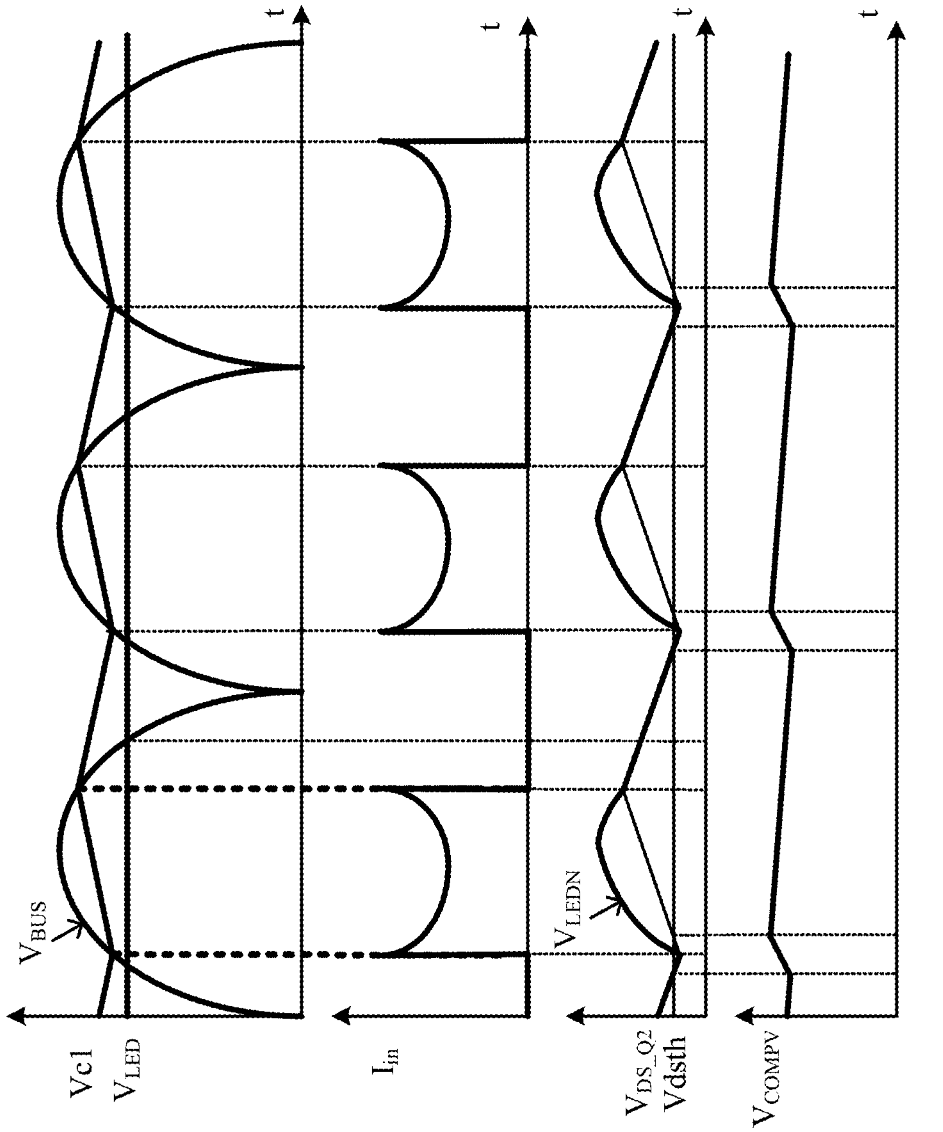
FIG. 4 is an operating waveform diagram of example operation of the LED driving circuits when in a steady state, in accordance with embodiments of the present invention.

Referring now to FIG. 4, shown is an operating waveform diagram of example operation of the LED driving circuits when in a steady state, in accordance with embodiments of the present invention. A bus voltage at the output of rectifier circuit 3 may be represented as $V_{BUS}$, the voltage of capacitor C1 represented as Vc1, the load voltage of the LED load represented as $V_{LEDN}$, a current at the output of rectifier circuit 3 represented as Iin, the voltage at the common terminal of power switch Q2 and the LED load represented as $V_{LEDN}$, the voltage difference between the two terminals of power switch Q2 represented as $V_{DS\_Q2}$, and control signal represented as $V_{COMPV}$. Here, voltage $V_{LEDN}$ or voltage difference $V_{DS\_Q2}$ may directly serve as voltage sampling signal Vs. For example, voltage sampling signal Vs can be proportional to voltage $V_{LEDN}$ or voltage difference $V_{DS\_Q2}$.

As shown in FIG. 4, the magnitude of control signal $V_{COMPV}$ can increase when voltage difference $V_{DS\_Q2}$ is less than threshold voltage Vdsth, and decrease when voltage difference $V_{DS\_Q2}$ is greater than threshold voltage Vdsth, such that voltage Vc1 closely matches load voltage $V_{LED}$ in the steady state, thereby reducing the difference between voltage Vc1 and load voltage $V_{LED}$ and improving the efficiency of the LED driving circuit. For example, voltage difference $V_{DS\_Q2}$ may serve as voltage sampling signal Vs.

However, those skilled in the art will recognize that voltage $V_{LEDN}$ can also serve as voltage sampling signal Vs. For example, the magnitude of control signal $V_{COMPV}$ can increase when voltage $V_{LEDN}$ is less than threshold voltage Vdsth, and decrease when voltage $V_{LEDN}$ is greater than threshold voltage Vdsth, such that voltage Vc1 closely matches load voltage $V_{LED}$ in the steady state, thereby reducing the difference between voltage Vc1 and load voltage $V_{LED}$ and improving the efficiency of the LED driving circuit.

Figure 5:
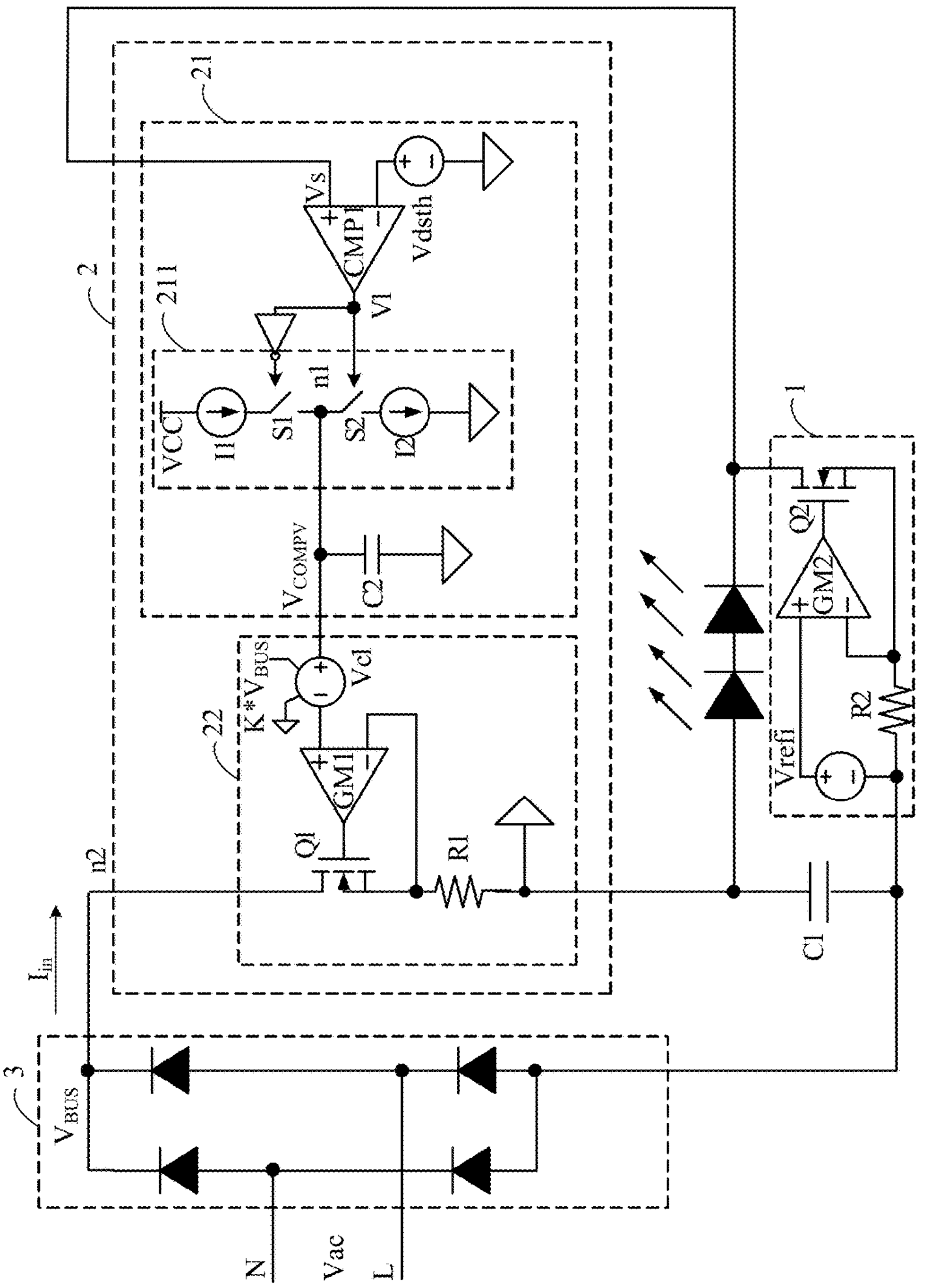
FIG. 5 is a schematic block diagram of a third example LED driving circuit, in accordance with embodiments of the present invention.

Referring now to FIG. 5, shown is a schematic block diagram of a third example LED driving circuit, in accordance with embodiments of the present invention. In this particular example, capacitor C1 can connect between a low-potential terminal of the output of rectifier circuit 3 and the ground potential, and node n2 can be configured as the high-potential terminal of the output of rectifier circuit 3. For example, voltage control circuit 22 can connect between the high-potential terminal (e.g., node n2) of the output of rectifier circuit 3 and the ground potential. For example, power switch Q1 and resistor R1 in voltage control circuit 22 can connect in series between node n2 and the ground potential.

Figure 6:
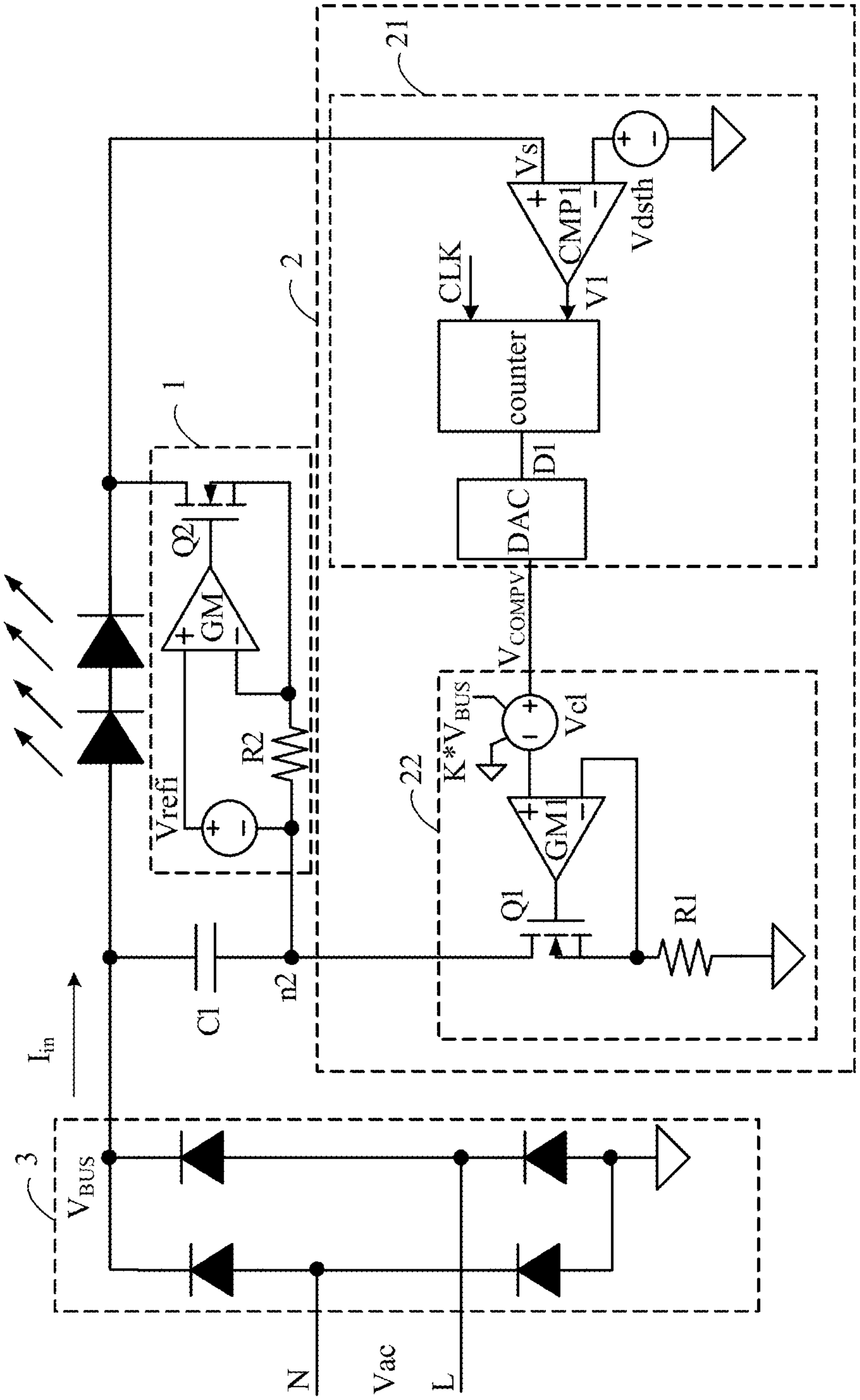
FIG. 6 is a schematic block diagram of a fourth example LED driving circuit, in accordance with embodiments of the present invention.

Referring now to FIG. 6, shown is a schematic block diagram of a fourth example LED driving circuit, in accordance with embodiments of the present invention. In this particular example, control signal generation circuit 21 can include comparator CMP1, a counter, and digital-to-analog conversion circuit (DAC). The first input of comparator CMP1 may receive voltage sampling signal Vs, the second input of comparator CMP1 may receive threshold voltage Vdsth, and the output of comparator CMP1 can generate comparison signal V1. The counter can receive comparison signal V1 and clock signal CLK, and output digital signal D1. The digital-to-analog conversion circuit DAC can receive digital signal D1, and convert digital signal D1 into control signal $V_{COMPV}$. The counter can detect a level state of comparison signal V1 at intervals by clock signal CLK. When comparison signal V1 is at a high level, the counter can increment by one, and when comparison signal V1 is at a low level, the counter may decrement by one. For example, the level state of comparison signal V1 can be detected each time a clock pulse comes.

Figure 7:
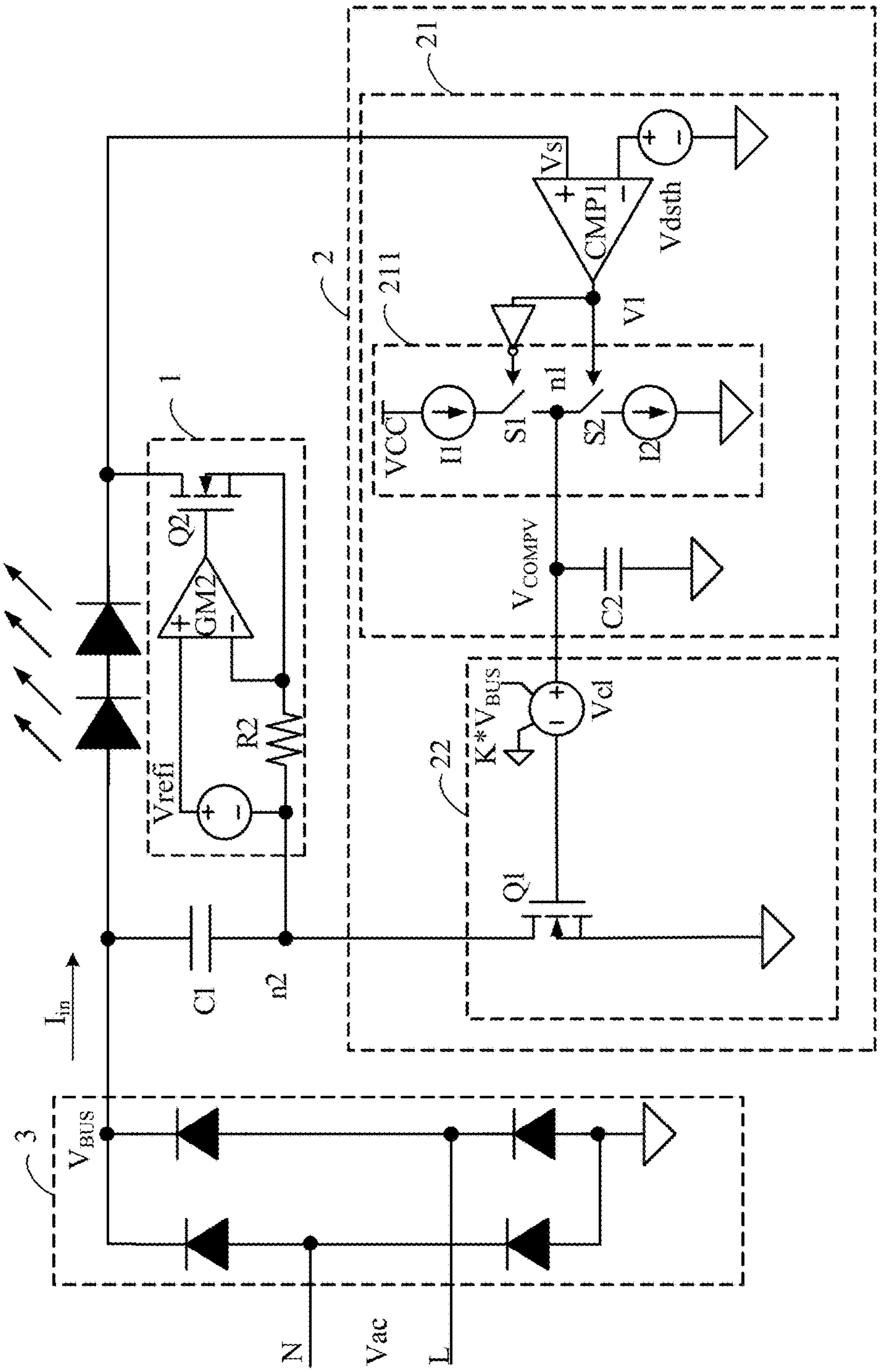
FIG. 7 is a schematic block diagram of a fifth example LED driving circuit, in accordance with embodiments of the present invention.

Referring now to FIG. 7, shown is a schematic block diagram of a fifth example LED driving circuit, in accordance with embodiments of the present invention. In this particular example, voltage control circuit 22 can include power switch Q1 that can connect in series between node n2 and the ground potential. The control terminal of power switch Q1 can connect to the first power terminal of voltage-controlled voltage source Vc1, the second power terminal of voltage-controlled voltage source Vc1 may receive control signal $V_{COMPV}$, and the variation trend of the voltage at the first power terminal of voltage-controlled voltage source Vc1 can be consistent with the variation trend of control signal $V_{COMPV}$. The control terminal of voltage-controlled voltage source Vc1 may receive a first reference signal. As an example, the first reference signal can be proportional to bus voltage VBUS, e.g., $K*V_{BUS}$, where K is a scaling factor. Therefore, the voltage at the first power terminal of voltage-controlled voltage source Vc1 is $V_{COMPV}$-$K*V_{BUS}$.

Figure 8:
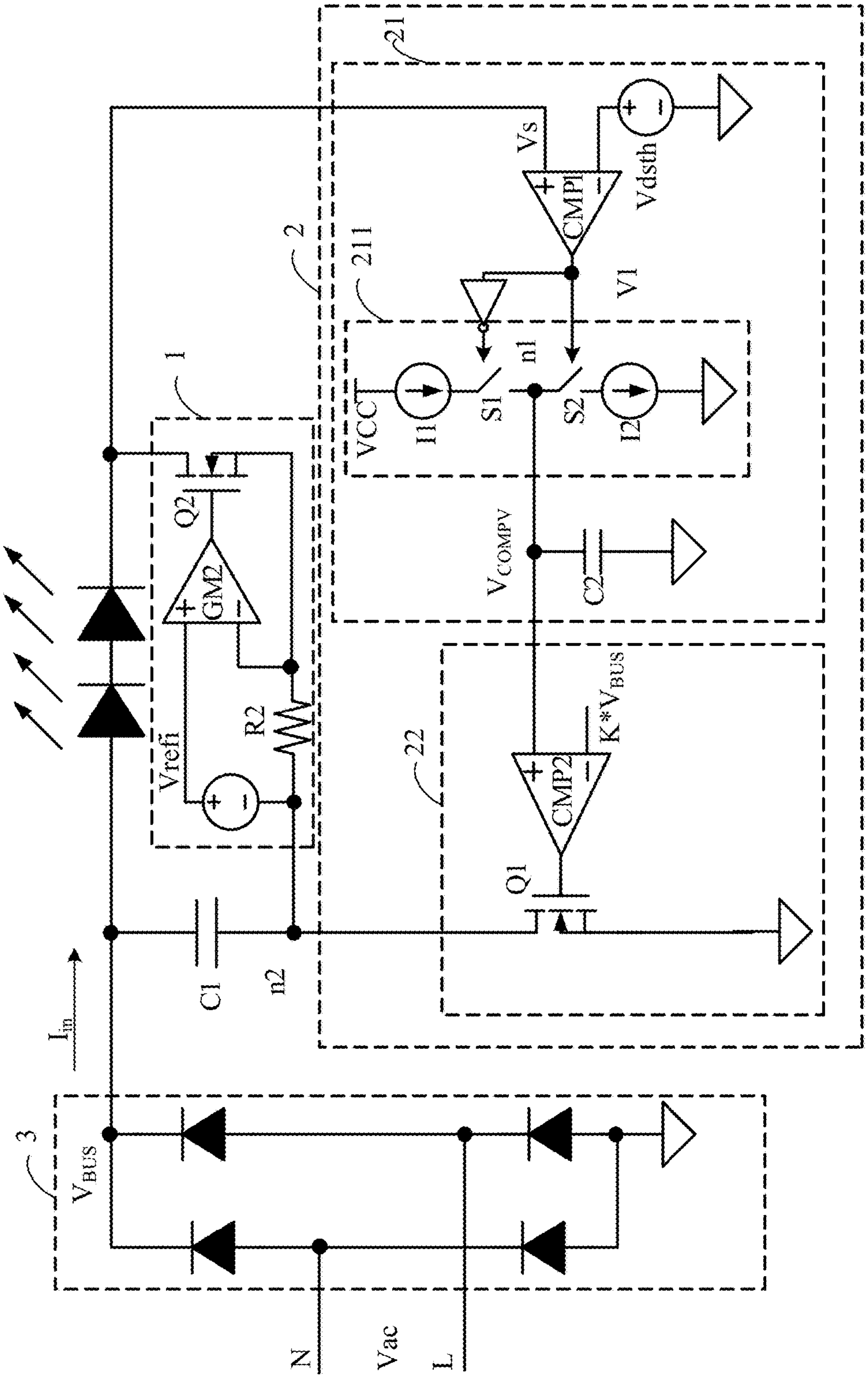
FIG. 8 is a schematic block diagram of a sixth example LED driving circuit, in accordance with embodiments of the present invention.

Referring now to FIG. 8, shown is a schematic block diagram of a sixth example LED driving circuit, in accordance with embodiments of the present invention. In this particular example, voltage control circuit 22 can include power switch Q1 and comparator CMP2. Power switch Q1 can connect in series between node n2 and the ground potential. A first input of comparator CMP2 may receive control signal $V_{COMPV}$, a second input of comparator CMP2 may receive a first reference signal, and an output of comparator CMP2 can connect to the control terminal of power switch Q1. As an example, the first reference signal can be proportional to bus voltage $V_{BUS}$, e.g., $K*V_{BUS}$, where K is a scaling factor. Power switch Q1 may operate in a switching state, and when control signal $V_{COMPV}$ is greater than the first reference signal, power switch Q1 can close, a current may flow through power switch Q1, and the voltage of capacitor C1 can increase. When control signal $V_{COMPV}$ is less than the first reference signal, power switch Q1 can open, the current flowing through power switch Q1 may become zero, and the voltage of capacitor C1 can decrease.

Figure 9:
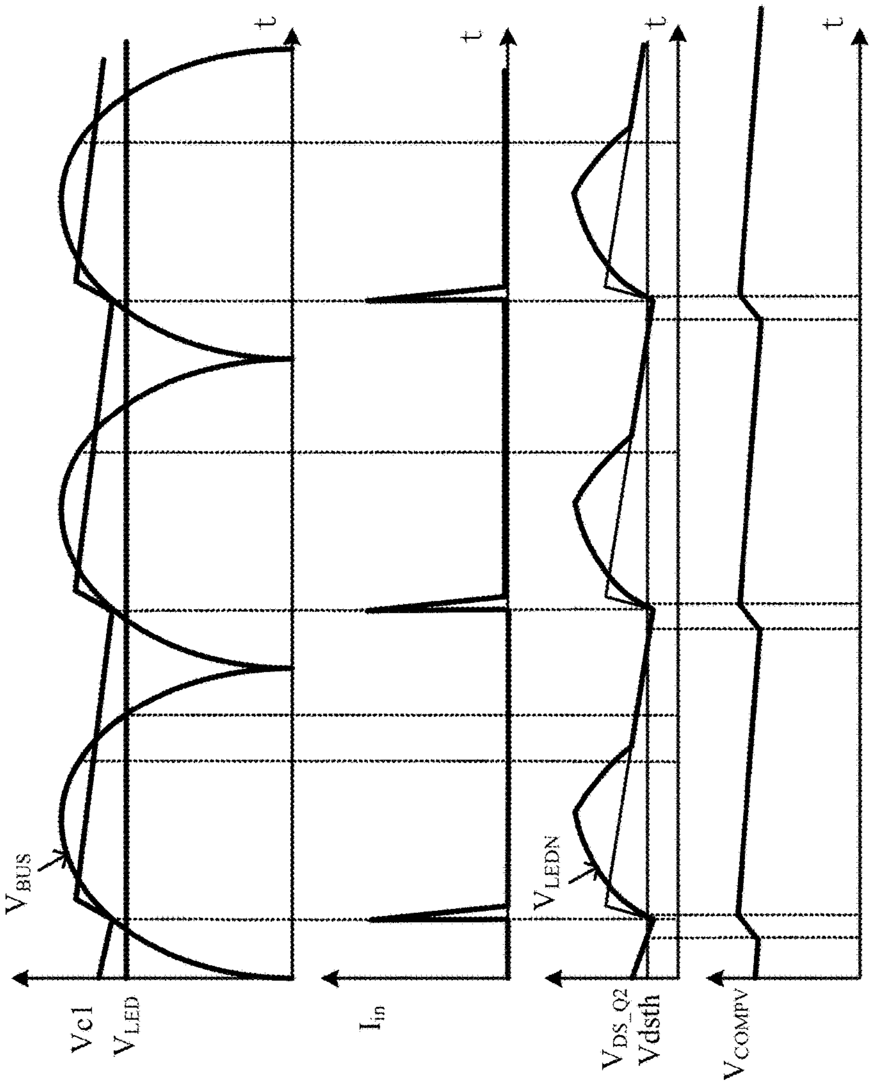
FIG. 9 is an operating waveform diagram of example operation of the LED driving circuit when in the steady state, in accordance with embodiments of the present invention.

Referring now to FIG. 9, shown is an operating waveform diagram of example operation of the LED driving circuit when in the steady state, in accordance with embodiments of the present invention. Here, the bus voltage at the output of rectifier circuit 3 can be represented as $V_{BUS}$, the voltage of capacitor C1 represented as Vc1, the load voltage of the LED load represented as $V_{LED}$, the current at the output of rectifier circuit 3 represented as Iin, the voltage at the common terminal of power switch Q2 and the LED load represented as $V_{LEDN}$, the voltage difference between the two terminals of power switch Q2 represented as $V_{DS\_Q2}$, and control signal represented as $V_{COMPV}$. As an example, voltage $V_{LEDN}$ at the common terminal of power switch Q2 and the LED load or voltage difference $V_{DS\_Q2}$ between the two terminals of power switch Q2 may directly serve as voltage sampling signal Vs. As another example, voltage sampling signal Vs can be proportional to voltage $V_{LEDN}$ at the common terminal of power switch Q2 and the LED load or voltage difference $V_{DS\_Q2}$ between the two terminals of power switch Q2.

As shown in FIG. 9, the magnitude of control signal $V_{COMPV}$ can increase when voltage $V_{LEDN}$ is less than threshold voltage Vdsth, and decrease when voltage $V_{LEDN}$ is greater than threshold voltage Vdsth, such that voltage Vc1 closely matches load voltage $V_{LED}$ in the steady state, thereby reducing the difference between voltage Vc1 and load voltage $V_{LED}$ and improving the efficiency of the LED driving circuit. For example, voltage $V_{LEDN}$ may serve as voltage sampling signal Vs. However, those skilled in the art will recognize that voltage difference $V_{DS\_Q2}$ can also serve as voltage sampling signal Vs. For example, the magnitude of control signal $V_{COMPV}$ can increase when voltage difference $V_{DS\_Q2}$ is less than threshold voltage Vdsth, and decrease when voltage difference $V_{DS\_Q2}$ is greater than threshold voltage Vdsth, such that voltage Vc1 closely matches load voltage $V_{LED}$ in the steady state, thereby reducing the difference between voltage Vc1 and load voltage $V_{LED}$ and improving the efficiency of the LED driving circuit.

Figure 10:
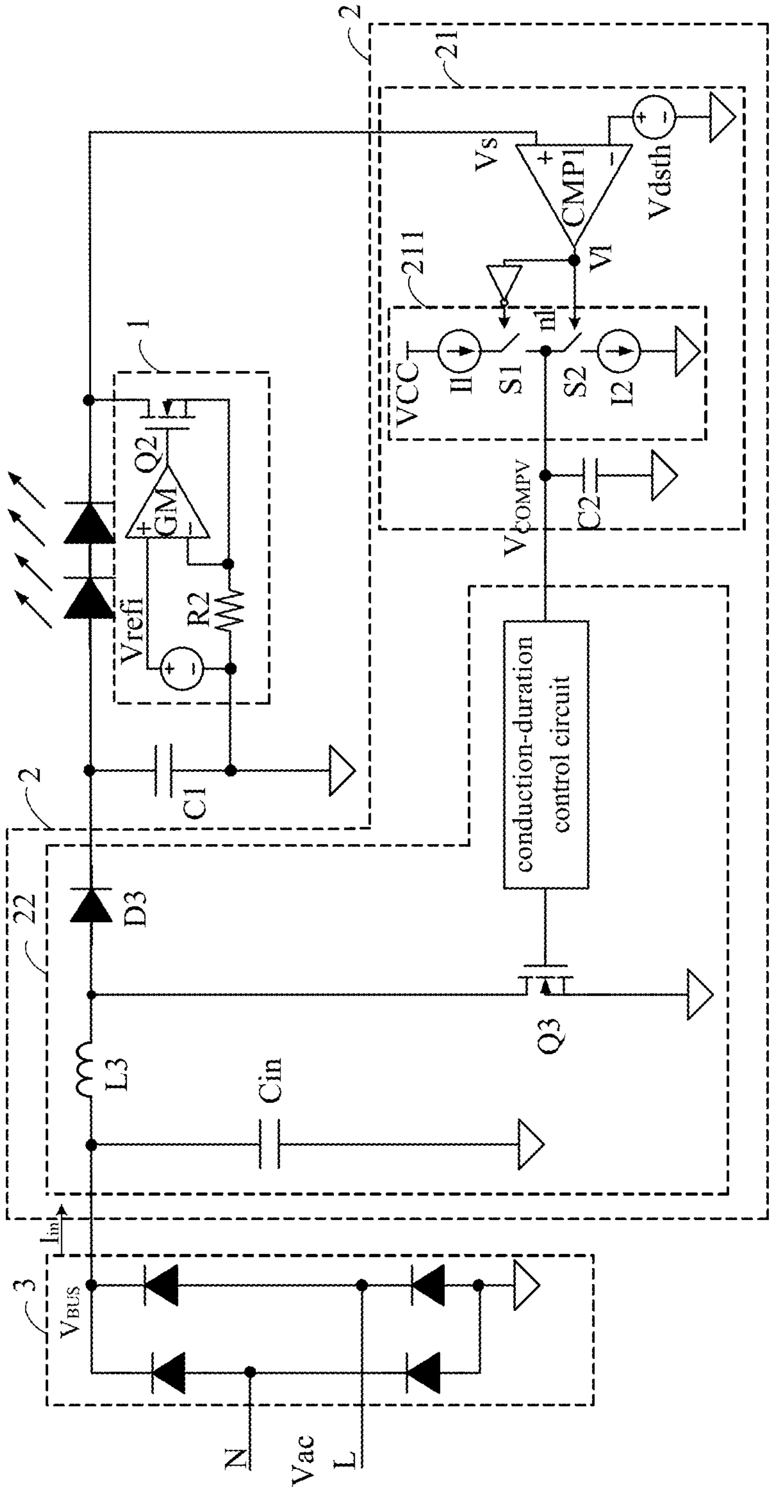
FIG. 10 is a schematic block diagram of a seventh example LED driving circuit, in accordance with embodiments of the present invention.

Referring now to FIG. 10, shown is a schematic block diagram of a seventh example LED driving circuit, in accordance with embodiments of the present invention. In this particular example, voltage control circuit 22 can connect to the output of rectifier circuit 3, capacitor C1 can connect to the output of voltage control circuit 22, and voltage control circuit 22 may directly control the voltage of capacitor C1 based on control signal $V_{COMPV}$. Voltage control circuit 22 can include a power stage circuit that can connect to the output of rectifier circuit 3. Capacitor C1 can connect to an output of the power stage circuit, and conduction durations of switching transistors in the power stage circuit can be controlled by control signal $V_{COMPV}$ to control the voltage of capacitor C1. For example, when the magnitude of control signal $V_{COMPV}$ increases, a conduction duration of a main switching transistor in the power stage circuit can increase and the voltage of capacitor C1 may increase. Also, when the magnitude of control signal $V_{COMPV}$ decreases, the conduction duration of the main switching transistor in the power stage circuit can decrease and the voltage of capacitor C1 may decrease.

In particular embodiments, voltage control circuit 22 can also include a conduction-duration control circuit, and the power stage circuit can be configured as a boost circuit. The boost circuit can include input capacitor Cin, inductor L3, diode D3, and main switching transistor Q3. Input capacitor Cin can filter bus voltage $V_{BUS}$ to provide an input voltage for the boost circuit. Inductor L3 and diode D3 can connect in series between a high-potential terminal of the output of rectifier circuit 3 and a high-potential terminal of capacitor C1. Main switching transistor Q3 can connect between the ground potential and a common terminal of inductor L3 and diode D3. The conduction-duration control circuit can receive control signal $V_{COMPV}$, and may control a conduction duration of main switching transistor Q3 based on the first control signal. When the magnitude of control signal $V_{COMPV}$ increases, the conduction duration of main switching transistor Q3 can increase, and a voltage at an output of the boost circuit may increase, such that the voltage of capacitor C1 increases. Also, when the magnitude of control signal $V_{COMPV}$ decreases, the conduction duration of main switching transistor Q3 can decrease, and the voltage at the output of the boost circuit may decrease, such that the voltage of capacitor C1 decreases. Further, the power stage circuit may be any suitable converter topology in certain embodiments.

Figure 11:
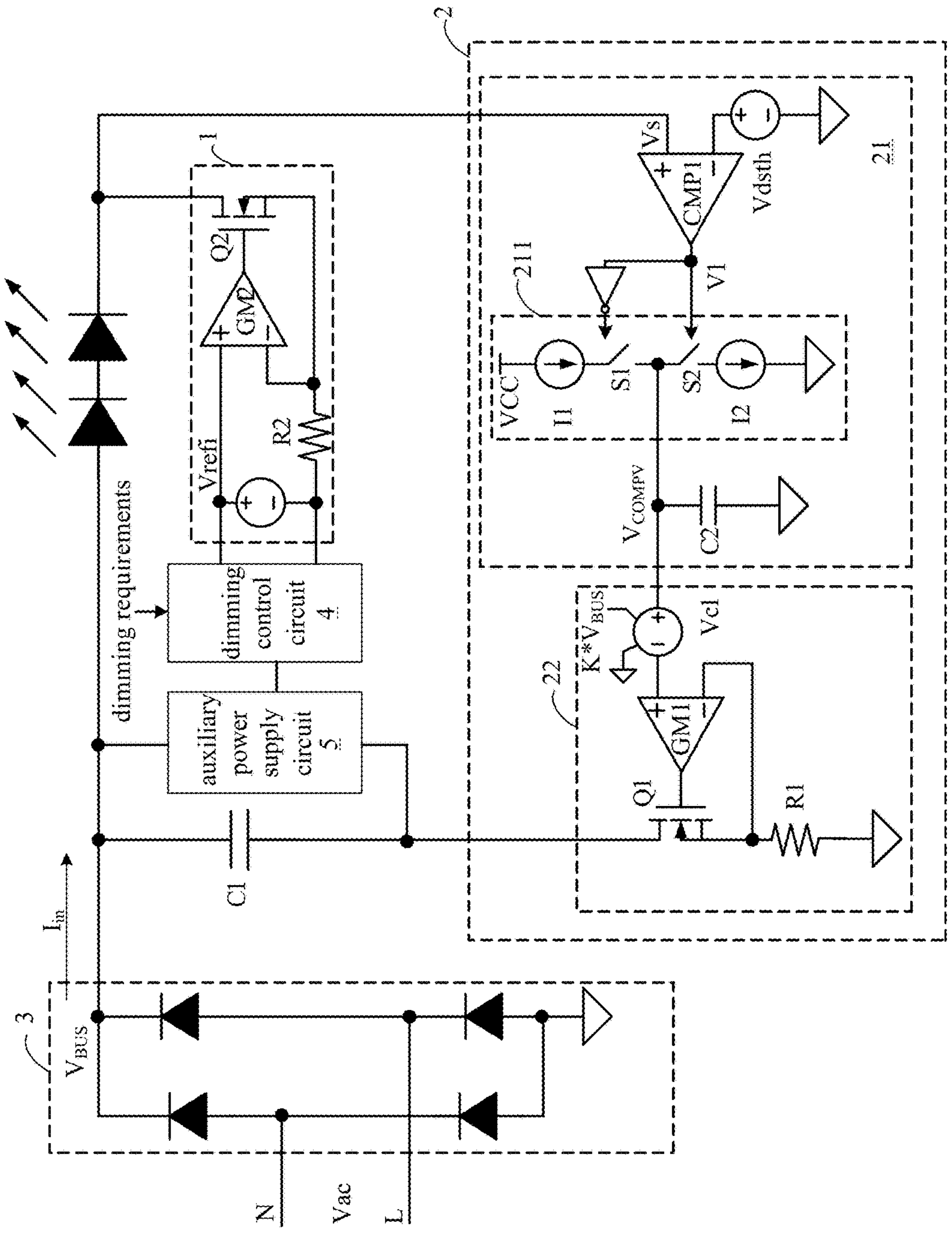
FIG. 11 is a schematic block diagram of an eighth example LED driving circuit, in accordance with embodiments of the present invention.

Referring now to FIG. 11, shown is a schematic block diagram of an eighth example LED driving circuit, in accordance with embodiments of the present invention. In this particular example, the LED driving circuit can also include dimming control circuit (DCC) 4 and auxiliary power supply circuit (APSC) 5. Dimming control circuit 4 can generate a dimming control signal Vrefi based on dimming requirements and provide dimming control signal Vrefi to linear driving circuit 1. Linear driving circuit 1 can control the current flowing through the LED load based on dimming control signal Vrefi. Auxiliary power supply circuit 5 and capacitor C1 can connect in parallel (e.g., capacitor C1 may serve as an input capacitor of the auxiliary power supply circuit). Also, the voltage of capacitor C1 can be converted into a power supply voltage for the auxiliary power supply circuit, and the auxiliary power supply circuit can at least charge dimming control circuit 4. For example, when dimming control circuit 4 is packaged on a dimming chip, the power supply voltage can charge the dimming chip. Auxiliary power supply circuit 5 may share capacitor C1 as its input capacitor, thereby reducing electromagnetic interference (EMI).

In some examples, capacitor C1 and voltage control circuit 22 can connect in series in the order listed between the high-potential terminal of the output of rectifier circuit 3 and the ground potential. However, the positions of capacitor C1 and voltage control circuit 22 are interchangeable in certain embodiments, such as where voltage control circuit 22 and capacitor C1 can connect in series in the order listed between the high-potential terminal of the output of rectifier circuit 3 and the ground potential. Furthermore, control signal generation circuit 21 can be adjusted on the basis of the particular configuration. However, control signal generation circuit 21 of each of the examples above can be adjusted to be the same as in other examples herein.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A light-emitting diode (LED) driving circuit configured to drive an LED load, the LED driving circuit comprising:

a) a linear driving circuit coupled in series with the LED load between a first terminal and a second terminal, in order to control a current flowing through the LED load;

b) a first capacitor connected with the first terminal and the second terminal; and c) a control circuit configured to decrease a difference between a voltage of the first capacitor and a load voltage of the LED load, in order to increase an efficiency of the LED driving circuit, wherein the difference between the voltage of the first capacitor and the load voltage of the LED load is equal to a difference between two terminals of the linear driving circuit.

2. The LED driving circuit of claim 1, wherein the control circuit is configured to control the voltage of the first capacitor based on a voltage sampling signal indicating one of a difference between the voltage of the first capacitor and the load voltage of the LED load, and the voltage difference between the two terminals of the linear driving circuit.

3. The LED driving circuit of claim 1, wherein:

a) the control circuit is configured to compare the voltage sampling signal against a threshold voltage to control the voltage of the first capacitor;

b) when the voltage sampling signal is greater than the threshold voltage, the control circuit is configured to decrease the voltage of the first capacitor; and c) when the voltage sampling signal is less than the threshold voltage, the control circuit is configured to increase the voltage of the first capacitor.

4. The LED driving circuit of claim 1, wherein the control circuit comprises:

a) a first control signal generation circuit configured to receive the voltage sampling signal and the threshold voltage to obtain a first control signal;

b) a voltage control circuit configured to receive the first control signal and control the voltage of the first capacitor based on the first control signal; and c) wherein the first capacitor is coupled in series with the voltage control circuit, or the first capacitor is coupled to an output of the voltage control circuit.

5. The LED driving circuit of claim 4, wherein a variation trend of the first control signal is opposite to a variation trend of the voltage sampling signal, and the variation trend of the first control signal is consistent with a variation trend of the voltage of the first capacitor.

6. The LED driving circuit of claim 4, wherein:

a) the first control signal generation circuit comprises a first comparator;

b) a first input of the first comparator is configured to receive the voltage sampling signal, a second input of the first comparator is configured to receive the threshold voltage, and an output of the first comparator is configured to generate a first comparison signal; and c) a magnitude of the first control signal increases when the voltage sampling signal is less than the threshold voltage, and the magnitude of the first control signal decreases when the voltage sampling signal is greater than the threshold voltage.

7. The LED driving circuit of claim 6, wherein:

a) the first control signal generation circuit further comprises a second capacitor and a charging-discharging circuit;

b) a voltage of the second capacitor is configured as the first control signal;

c) when the voltage sampling signal is less than the threshold voltage, the charge-discharge circuit charges the second capacitor, thus increasing the magnitude of the first control signal; and d) when the voltage sampling signal is greater than the threshold voltage, the charge-discharge circuit discharges the second capacitor, thus decreasing the magnitude of the first control signal.

8. The LED driving circuit of claim 7, wherein the charging-discharging circuit comprises:

a) a first constant current source and a first switch coupled in series between a power supply and a first node;

b) a second constant current source and a second switch coupled in series between the first node and a ground potential;

c) wherein the second capacitor is coupled between the first node and the ground potential; and d) wherein an operational state of the second switch is controlled by the first comparison signal, and an operational state of the first switch is controlled by an inverted signal of the first comparison signal.

9. The LED driving circuit of claim 6, wherein the first control signal generation circuit further comprises:

a) a counter configured to receive the first comparison signal and a clock signal, and to output a first digital signal;

b) a digital-to-analog conversion circuit configured to receive the first digital signal, and to convert the first digital signal into the first control signal;

c) wherein the counter is configured to detect a level state of the first comparison signal at intervals by the clock signal;

d) wherein the counter is configured to increment by one when the first comparison signal is at a high level; and e) wherein the counter is configured to decrement by one when the first comparison signal is at a low level.

10. The LED driving circuit of claim 4, wherein the voltage control circuit and the first capacitor are coupled in series to an output of a rectifier circuit, and the voltage control circuit is configured to control a current flowing through the first capacitor based on the first control signal, in order to control the voltage of the first capacitor.

11. The LED driving circuit of claim 10, wherein the voltage control circuit comprises:

a) a first power switch and a first sampling unit coupled in series between a second node and a ground potential;

b) a first error amplifier, wherein a first input of the first error amplifier is coupled to a first power terminal of a first voltage-controlled voltage source, a second input of the first error amplifier is coupled to a common terminal of the first power switch and the first sampling unit, and an output of the first error amplifier is coupled to a control terminal of the first power switch; and c) wherein a second power terminal of the first voltage-controlled voltage source is configured to receive the first control signal, and a variation trend of a voltage of the first power terminal of the first voltage-controlled voltage source coincides with the variation trend of the first control signal.

12. The LED driving circuit of claim 10, wherein the voltage control circuit comprises:

a) a first power switch coupled in series between a second node and a ground potential; and b) wherein a control terminal of the first power switch is coupled to a first power terminal of a first voltage-controlled voltage source, a second power terminal of the first voltage-controlled voltage source is configured to receive the first control signal, and a variation trend of a voltage of the first power terminal of the first voltage-controlled voltage source coincides with the variation trend of the first control signal.

13. The LED driving circuit of claim 10, wherein the voltage control circuit comprises:

a) a first power switch coupled in series between a second node and a ground potential; and b) a second comparator, wherein a first input of the second comparator is configured to receive the first control signal, a second input of the second comparator is configured to receive a first reference signal, and an output of the second comparator is coupled to a control terminal of the first power switch.

14. The LED driving circuit of claim 4, wherein the first capacitor is coupled between a high-potential terminal of the output of the rectifier circuit and a second node, and the second node is configured as a common node of the first capacitor and the voltage control circuit.

15. The LED driving circuit of claim 4, wherein the first capacitor is coupled between a low-potential terminal of the output of the rectifier circuit and a ground potential, and the voltage control circuit is coupled between a high-potential terminal of the output of the rectifier circuit and the ground potential.

16. The LED driving circuit of claim 11, wherein the first power switch operates in a linear state, and wherein:

a) when a magnitude of the first control signal increases, a current flowing through the first power switch increases and the voltage of the first capacitor increases; and b) when the magnitude of the first control signal decreases, the current flowing through the first power switch decreases and the voltage of the first capacitor decreases.

17. The LED driving circuit of claim 13, wherein the first power switch operates in a switching state, and wherein:

a) when the first control signal is greater than the first reference signal, the first power switch is closed, a current flows through the first power switch, and the voltage of the first capacitor increases; and b) when the first control signal is less than the first reference signal, the first power switch is open, the current flowing through the first power switch becomes zero, and the voltage of the first capacitor decreases.

18. The LED driving circuit of claim 4, wherein the voltage control circuit is coupled to an output of a rectifier circuit, the first capacitor is coupled to the output of the voltage control circuit, and the voltage control circuit is configured to control the voltage of the first capacitor based on the first control signal.

19. The LED driving circuit of claim 18, wherein:

a) the voltage control circuit comprises a power stage circuit coupled to an output of the rectifier circuit; and b) the first capacitor is coupled to an output of the power stage circuit, and is configured to control, by the first control signal, conduction durations of switching transistors in the power stage circuit, in order to control the voltage of the first capacitor.

* * * * *